(12) United States Patent
Aun et al.

(10) Patent No.: US 12,147,795 B2
(45) Date of Patent: Nov. 19, 2024

(54) SYSTEMS AND METHODS FOR AUTOMATED DIGITAL ENROLLMENT

(71) Applicant: BANK OF MONTREAL, Toronto (CA)

(72) Inventors: Muhammad Aun, Toronto (CA); Subashan Maheswaramoothy, Toronto (CA); Romulus Lucic, Toronto (CA); Devin Hewitt, Toronto (CA)

(73) Assignee: BANK OF MONTREAL, Toronto (CA)

( * ) Notice: Subject to any disclaimer, the term of this patent is extended or adjusted under 35 U.S.C. 154(b) by 121 days.

(21) Appl. No.: 17/217,297

(22) Filed: Mar. 30, 2021

(65) Prior Publication Data

US 2021/0311710 A1 Oct. 7, 2021

Related U.S. Application Data

(60) Provisional application No. 63/005,787, filed on Apr. 6, 2020.

(51) Int. Cl.
*H04L 67/148* (2022.01)
*G06F 8/61* (2018.01)
(Continued)

(52) U.S. Cl.
CPC ............... *G06F 8/61* (2013.01); *G06F 9/542* (2013.01); *G06F 9/547* (2013.01); *H04L 67/02* (2013.01); *H04L 67/146* (2013.01); *H04L 67/148* (2013.01)

(58) Field of Classification Search
CPC ....... G06F 9/542; H04L 67/02; H04L 67/146; H04L 67/148
(Continued)

(56) References Cited

U.S. PATENT DOCUMENTS 9,077,713 B1  7/2015 Zheng et al.
10,819,522 B1 * 10/2020 Roy .................. G06F 21/46
(Continued)

FOREIGN PATENT DOCUMENTS

CA  3169662 A1 * 12/2015 ........... G06F 9/5061
FR  3028979 A1 *  5/2016 ............ G06F 21/45

OTHER PUBLICATIONS

IP.com Disclosure. "Easy First Activation in an Enterprise Environment", IP.com Prior Art Technical Disclosure, Dec. 21, 2016. IP.com No. IPCOM000248623D [retrieved on Sep. 21, 2022]. Retrieved from the Internet: <URL: https://ip.com/IPCOM/000248623 (Year: 2016).*

*Primary Examiner* — Khanh Q Dinh
(74) *Attorney, Agent, or Firm* — FOLEY & LARDNER LLP

(57) ABSTRACT

Disclosed herein are embodiments of systems, methods, and products comprising an analytic server for automated digital account/application enrollment. The analytic server may open a new account for a user during a registration process. The analytic server may facilitate automated digital enrollment to allow the user to manage the new account in a mobile application on the user's mobile device. The analytic server may send a text message comprising a direct link to the user's mobile device. The link may direct the user to the app store, where the user can download and install the mobile application automatically. The analytic server may also display a button that allows the user to activate a QR code and scan the QR code using the camera of the user's mobile device. Upon the mobile device scanning the QR code, the analytic server may automatically launch the mobile application and sign the user in.

18 Claims, 9 Drawing Sheets

(51) Int. Cl.
  *G06F 9/54* (2006.01)
  *H04L 67/02* (2022.01)
  *H04L 67/146* (2022.01)
(58) Field of Classification Search
  USPC .................................. 709/220, 224, 226, 228
  See application file for complete search history.

(56) References Cited

U.S. PATENT DOCUMENTS

| | | | | |
|---|---|---|---|---|
| 11,184,766 | B1* | 11/2021 | Lord | H04L 63/107 |
| 11,677,547 | B1* | 6/2023 | McDonald | H04L 9/3247 |
| | | | | 713/171 |
| 2013/0110728 | A1* | 5/2013 | Kobres | H04W 12/10 |
| | | | | 705/78 |
| 2013/0111208 | A1* | 5/2013 | Sabin | G06F 21/36 |
| | | | | 713/176 |
| 2013/0211833 | A1* | 8/2013 | Edwards | H04M 3/436 |
| | | | | 715/708 |
| 2014/0225978 | A1* | 8/2014 | Saban | G06T 7/0012 |
| | | | | 348/14.07 |
| 2014/0367461 | A1* | 12/2014 | Raina | G06F 16/168 |
| | | | | 235/494 |
| 2015/0278454 | A1* | 10/2015 | Choi | G06Q 10/10 |
| | | | | 705/3 |
| 2015/0334108 | A1* | 11/2015 | Khalil | H04L 63/10 |
| | | | | 726/8 |
| 2016/0036809 | A1* | 2/2016 | Bhimanaik | H04L 63/102 |
| | | | | 726/4 |
| 2017/0032435 | A1* | 2/2017 | Torres | G06Q 30/0629 |
| 2017/0243190 | A1* | 8/2017 | Kieffer | G06Q 20/3274 |
| 2017/0308902 | A1* | 10/2017 | Quiroga | G06Q 20/351 |
| 2018/0150832 | A1* | 5/2018 | Badal-Badalian | |
| | | | | G06Q 20/3276 |
| 2019/0279326 | A1* | 9/2019 | Chen | H04L 9/30 |
| 2020/0398662 | A1* | 12/2020 | Martin | B60K 15/0406 |
| 2020/0402674 | A1* | 12/2020 | DeBates | G16H 40/67 |
| 2021/0234849 | A1* | 7/2021 | Lamb | G06Q 20/382 |
| 2021/0311710 | A1* | 10/2021 | Aun | H04L 67/146 |

* cited by examiner

SYSTEMS AND METHODS FOR AUTOMATED DIGITAL ENROLLMENT

This application claims priority to U.S. Provisional Patent Application No. 63/005,787, filed Apr. 6, 2020, which is incorporated by reference herein for all purposes.

TECHNICAL FIELD

This application generally relates to methods and systems for automated digital account enrollment.

BACKGROUND

As the processing power of computers allows for greater computer functionality and the Internet technology era allows for interconnectivity between computing systems, the shift from traditional banking to digital banking has become inevitable. Digital banking may involve high levels of process automation and web-based services. The digital banking may provide the benefits and ability for users to access financial data through mobile devices.

While utilizing digital banking is convenient and highly desirable for users, many technical challenges have been identified in the process of digital banking. For example, a user may open a bank account in a branch office during a registration process. After opening the bank account, the user may want to manage the bank account by utilizing the digital banking. However, to enable digital banking on a mobile device, the user may need to download and set up a mobile application on the user's mobile device. Such a process may require the user to input various information. The user may need to find the link to download the mobile application in an application store and install the mobile application. After that, the user may need to launch the mobile application and set up the user account. Specifically, the user may need to input user credentials, input a username and password, and select and answer security questions. Furthermore, the user may need to link the user's bank account by inputting the account number or card number. During this process, the user may need to look for the required information from different places. The user may forget certain information. The user may make mistakes when inputting the information. The user may be locked out for making mistakes.

The process for enabling digital banking on a user device can be frustrating, error-prone, and time consuming. The user may have to make phone calls to the call center of the bank or come back into the branch office for assistance, which is highly inefficient and may also create extra burden for the bank staff.

SUMMARY

For the aforementioned reasons, there is a need for a computer-implemented system and method that enables automated digital account/application enrollment on a mobile application. What is desired is a system and method that allows users to be fully digitally enabled, where the system and method have the mobile application automatically running on a user's mobile devices and the user is automatically signed in. Even though aspects of the methods and systems described herein are described in the context of banking application and/or account enrollment, it is expressly understood that these methods and systems are applicable to any electronic enrollment (e.g., account/application creations and/or enrollment).

Embodiments disclosed herein address the above challenges and other additional challenges by providing a system that bridges the traditional registration and the digital onboarding by bringing users to the mobile application with minimum operation from the users. For instance, an analytic server may open a new account for a user during a registration process. After the registration, the analytic server may facilitate the user to manage the new account in a mobile application on the user's mobile device. Furthermore, the analytic server may install, launch the mobile application, and log the user into the new account automatically without requiring the user to provide any information.

The analytic server may send a text message comprising a direct link to the user's mobile device. The link may direct the user to an application ("app") store, where the user can download and install the mobile application automatically. The analytic server may also display a button that allows the user to automatically launch the mobile application and automatically log in. The button may allow the user to activate a QR code and scan the QR code using the camera of the user's mobile device. Upon the mobile device scanning the QR code, the analytic server may automatically launch the mobile application and sign the user in. Furthermore, the analytic server may automatically enroll the user into a set of services and enable the corresponding key features within the mobile application.

Even though certain aspects of the embodiments disclosed herein are described as banking enrollment, the functionalities described herein may be applicable to enrollment of any other applications.

In an embodiment, a method comprises in response to presenting one or more input elements to be displayed on a first electronic device, receiving, by a server, at least one user attribute and a request for an automatic installation and enrollment of a mobile application on a second electronic device operated by a user; generating, by the server, a token corresponding to an encrypted account identifier associated with the user; presenting, by the server to be displayed on the first electronic device, an encoded graphical element corresponding to the token; receiving, by the server, an indication that the second electronic device has scanned the encoded graphical element, wherein the server receives the token from the second electronic device, wherein the mobile application is installed onto the second electronic device; and in response to the server decrypting the encrypted account identifier, automatically reconfiguring, by the server, the mobile application to access data associated with the user based on the account identifier.

In another embodiment, a computer system comprises a first electronic device, a second electronic device, and a server in communication with the first and second electronic devices and configured to: in response to presenting one or more input elements to be displayed on the first electronic device, receive at least one user attribute and a request for an automatic installation and enrollment of a mobile application on the second electronic device operated by a user; generate a token corresponding to an encrypted account identifier associated with the user; present, to be displayed on the first electronic device, an encoded graphical element corresponding to the token; receive an indication that the second electronic device has scanned the encoded graphical element, wherein the server receives the token from the second electronic device, wherein the mobile application is installed onto the second electronic device; and in response to the server decrypting the encrypted account identifier, automatically reconfigure the mobile application to access data associated with the user based on the account identifier.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
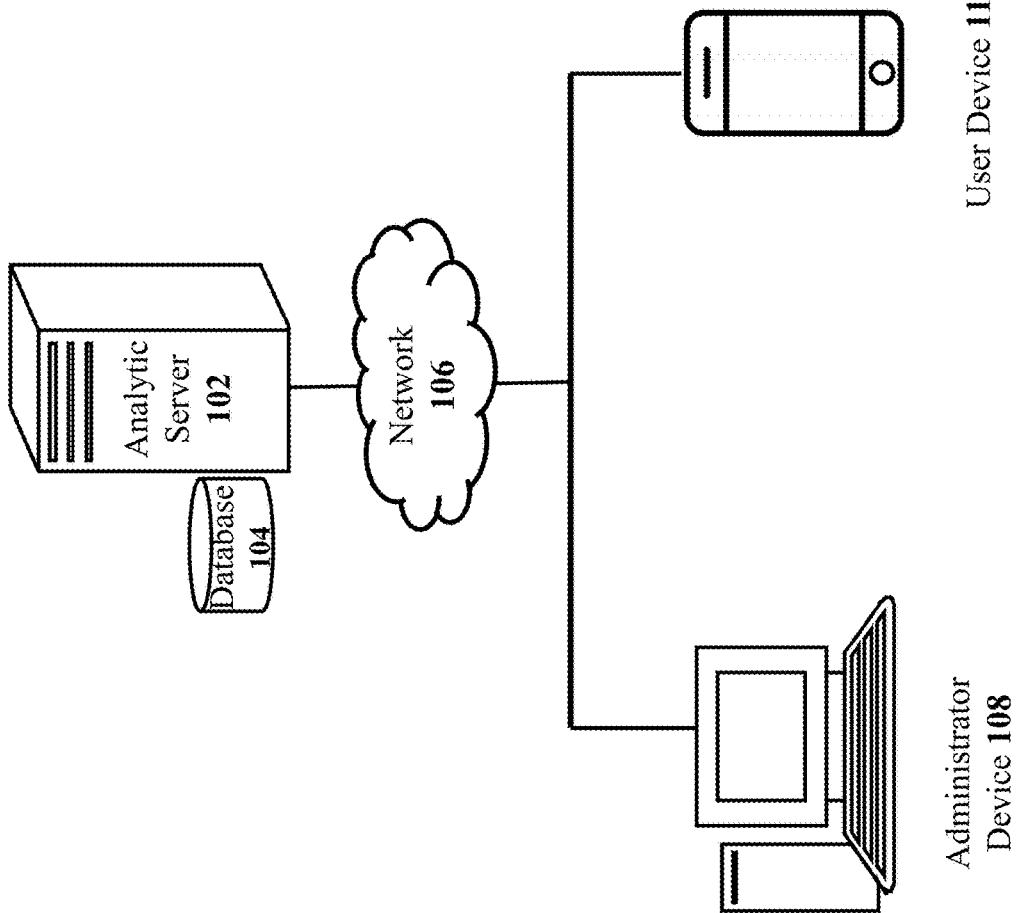
FIG. 1 illustrates a computer system for automated digital enrollment, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein provide a system and method for automated digital enrollment. Specifically, an analytic server may receive user attributes and user device information during a registration process. The user may complete the registration process on an administrator device in a bank branch office. After the registration process, the analytic server may assign a bank account for the user.

For convenience, the analytic server may provide a mobile application for the user to manage the bank account on a user device, such as a mobile phone. To facilitate the installment and enrollment of the mobile application on the user's mobile device, the analytic server may provide instruction steps on the administrator device. For example, in the first step, the analytic server may send a short message service ("SMS") text to the mobile device. The SMS message may comprise a direct link to the app store, where the user can download and install the mobile application automatically. In the second step, the analytic server may display a button on the administrator device that allows the user to automatically launch the mobile application and automatically log in. The button may allow the user to activate a QR code and scan the QR code using the camera of the user's mobile device. The downloaded mobile application may automatically launch and sign in the user. As a result, after the user opens a new account in the bank branch office, the system and method described herein allows the user to walk out of the branch office fully digitally enabled.

FIG. 1 illustrates components of a system 100 for automated digital enrollment, according to an embodiment. The system 100 may comprise an analytic server 102 with a database 104, an electronic administrator device 108, and an electronic user device 110, that are connected with each other via hardware and software components of one or more networks 106. Examples of the network 106 include, but are not limited to, Local Area Network ("LAN"), Wireless Local Area Network ("WLAN"), Metropolitan Area Network ("MAN"), Wide Area Network ("WAN"), and the Internet. The communication over the network 106 may be performed in accordance with various communication protocols, such as Transmission Control Protocol and Internet Protocol ("TCP/IP"), User Datagram Protocol ("UDP"), and IEEE communication protocols.

The analytic server 102 may be any computing device comprising a processor and other computing hardware and software components. The analytic server 102 may be logically and physically organized within the same or different devices or structures, and may be distributed across any number of physical structures and locations (e.g., cabinets, rooms, buildings, cities).

The analytic server 102 may be a computing device comprising a processing unit. The processing unit may include a processor with computer-readable medium, such as a random access memory coupled to the processor. The analytic server 102 may be running algorithms or computer executable program instructions, which may be executed by a single processor or multiple processors in a distributed configuration. The analytic server 102 may be configured to interact with one or more software modules of a same or a different type operating within the system 100.

Non-limiting examples of the processor may include a microprocessor, an application specific integrated circuit, and a field programmable object array, among others. Non-limiting examples of the analytic server 102 may include a server computer, a workstation computer, a tablet device, and a mobile device (e.g., smartphone). Some embodiments may include multiple computing devices functioning as the analytic server 102. Some other embodiments may include a single computing device capable of performing the various tasks described herein.

The electronic administrator device 108 may be any computing device allowing an administrative user to interact with the analytic server 102. The electronic administrator device 108 may be any computing device comprising a processor and non-transitory machine-readable storage medium. The examples of the computing device may include, but are not limited to, a desktop computer, a laptop, a personal digital assistant ("PDA"), a smartphone, a tablet computer, and the like. The electronic administrator device 108 may comprise any number of input and output devices supporting various types of data, such as text, image, audio, video, and the like.

The electronic administrator device 108 may be located in a bank branch office and operated by an employee/administrator in the bank. A user may come to the bank branch office to open a new account with the assistance of the administrator. The administrator may help the user to complete a registration process on the electronic administrator device 108 to open the new account. Specifically, the analytic server 102 may display input elements on the electronic administrator device 108 and receive inputs of the user's attributes, the user's contact information (e.g., email address, phone number), and other related information. Furthermore, the analytic server may require the user to register his/her electronic user device 110 (e.g., user's mobile device). For example, the analytic server 102 may collect the identifier of the user's registered mobile device, such as the mobile telephone number, the media access control ("MAC") address, international mobile equipment identity ("IMEI"), and a unique electronic identifier of the mobile device. The analytic server 102 may assign a bank account for the user after the registration. The bank account may comprise a card number, a user name, a password, and the like. The user may complete the registration process on the electronic administrator device 108 in a bank branch office. Alternatively, the user may complete the registration process on his/her own computer (not shown) at home.

For convenience, the analytic server 102 may provide a mobile application for the user to manage the bank account on the electronic user device 110. The user may be able to perform various banking operations by logging back into the user's account via the mobile application. At the end of registration process, the analytic server 102 may display one or more interactive elements on the electronic administrator device 108 that allow the user to install a mobile application on the electronic user device 110. For example, the analytic server 102 may display a button on the electronic administrator device 108. Upon the user clicking on the button, the analytic server 102 may send text link to the electronic user device 110. For example, the analytic server 102 may send a SMS text to the electronic user device 110 (e.g., the registered mobile device of the user) based on the mobile phone number collected through digital registration. The SMS message may comprise a direct link to the app store to download the mobile application.

The electronic user device 110 may be any computing device allowing a customer to interact with the analytic server 102. The electronic user device 110 may be any computing device comprising a processor and non-transitory machine-readable storage medium. The examples of the computing device may include, but are not limited to, a PDA, a smartphone, a tablet computer, and the like. The electronic user device 110 may be a mobile device or handheld computer that provide a touchscreen interface with digital buttons and keyboard or physical buttons along with a physical keyboard. The electronic user device 110 may comprise integrated cameras, digital media players, and the global positional system ("GPS") capabilities. The electronic user device 110 may comprise any number of input and output devices supporting various types of data, such as text, image, audio, video, and the like. The electronic user device 110 may run mobile operating systems that allow third-party applications to be installed and run. For example, the electronic user device 110 may install the digital banking application provided by the analytic server 102.

The electronic user device 110 may receive the SMS test. The user may click on the link in the SMS text on the electronic user device 110. The link may direct the user to the app store, where the user can download and install the mobile application automatically.

The analytic server may also display a button on the electronic administrator device 108 that allows the user to automatically launch the mobile application and automatically log in. The button may allow the user to activate a QR code and scan the QR code using the camera of the electronic user device 110. The downloaded mobile application may automatically launch and sign the user in.

The analytic server 102 may generate a token corresponding to the user's encrypted account identifier, such as the encrypted card number. The analytic server may return a handler for each encrypted card number. The handler may be time limited and valid for one-time use. The handler may comprise the key used to encrypt the card number. After the user activates the QR code, the analytic server 102 may generate the token, embed the token into the QR code, and display the QR code (e.g., encoded graphical element) on the electronic administrator device 108. Upon scanning of the encoded graphical element, the electronic user device 110 may read and extract the token in the encoded graphical element. The analytic server 102 may receive the encrypted card number from the mobile device (e.g., second electronic device).

The analytic server 102 may decrypt the encrypted card number by calling the token service based on the key in the handler. After the decryption, the analytic server 102 may obtain the user's card number. As a result, the analytic server 102 may be able to determine the user's account identifier. Upon the user scans the QR code with the electronic user device 110, the analytic server 102 may automatically launch the mobile application and automatically log the user into the mobile application and access data associated with the user based on the user's account identifier.

The database 104 may be any non-transitory machine-readable media configured to store user data. For instance, the database 104 may include the user's attributes, the user's contact information (e.g., email address, phone number), and other related information. The database 104 may also include identifier of the user's registered mobile device, such as the mobile telephone number, the MAC address, IMEI, and a unique electronic identifier of the mobile device. The database 104 may also include the token comprising the encrypted card number and the handler comprising the key.

The database 104 may be part of the analytic server 102. The database 104 may be a separate component in communication with the analytic server 102. The database 104 may have a logical construct of data files, which may be stored in non-transitory machine-readable storage media, such as a hard disk or memory, controlled by software modules of a database program (e.g., SQL), and a database management system that executes the code modules (e.g., SQL scripts) for various data queries and management functions.

Figure 2A:
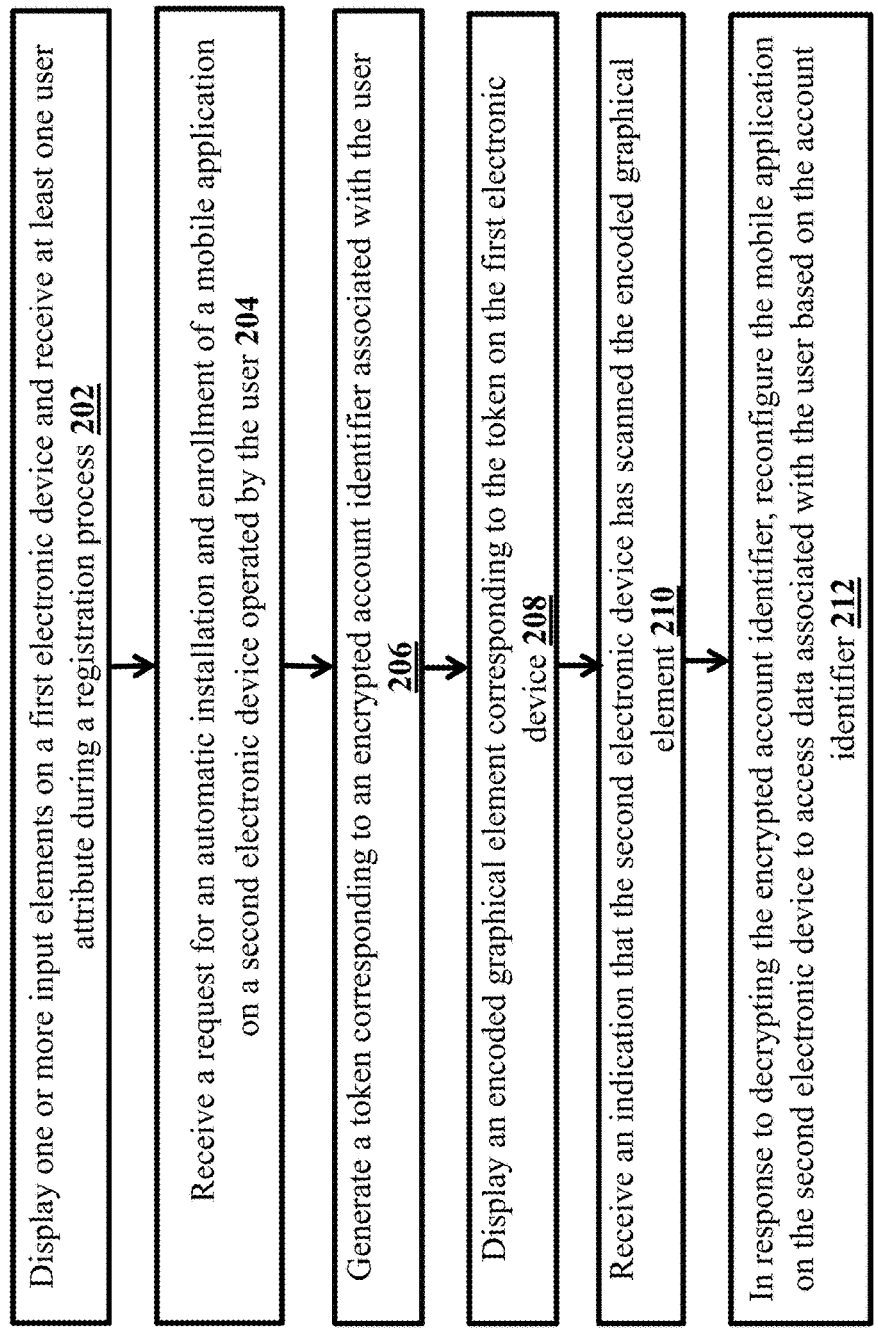
FIG. 2A illustrates a flowchart depicting operational steps for automated digital enrollment, according to an embodiment.

FIG. 2A illustrates execution of a method 200 for automated digital enrollment, according to an embodiment. Other embodiments may comprise additional or alternative steps, or may omit some steps altogether. Even though certain aspects of the embodiments disclosed herein are described as banking enrollment, the functionalities described herein may be applicable to enrollment of any other applications.

At step 202, the analytic server may display one or more input elements on a first electronic device and receive at least one user attribute during a registration process. The registration process may be a process for setting up a bank account or any other account. For example, during the registration process of the banking application, the analytic server may display input elements and receive inputs of the user's attributes, the user's contact information (e.g., email address, phone number), identifier of the user's registered device (e.g., the user's mobile device), and other related information. The analytic server may collect the identifier of the user's registered mobile device, such as the mobile telephone number, the MAC address, IMEI, and a unique electronic identifier of the mobile device. The analytic server may assign a bank account for the user after the registration. The bank account may comprise a card number, a user name, a password, and the like.

The user may complete the registration process on a computer (e.g., the first device) in a bank branch office. An administrator of the bank branch office (e.g., entity providing the service) operates the first electronic device. Alternatively, the user may complete the registration process on a computer (e.g., the first device) at home. The user operates the first electronic device. After the registration process, the user may be able to perform different banking operations by logging back into the user's account. The analytic server may also provide a mobile application for the user to manage the bank account on the user's registered mobile device (e.g., a second device) for convenience.

At step 204, the analytic server may receive a request for an automatic installation and enrollment of the mobile application on a second electronic device operated by the user. After a user completes the registration process on the first electronic device, the analytic server may display one or more interactive elements on the first electronic device that allow the user to install and launch the mobile application on a second electronic device. Specifically, the analytic server may display two instruction steps on a graphical user interface ("GUI"). The first step may instruct the user to get a text message with a link to download the mobile application. The second step may instruct the user to automatically launch the mobile application and sign in.

For example, in the first step, the analytic server may display a button on the first device. Upon the user clicking on the button, the analytic server may send a text link to the second electronic device. The analytic server may send a SMS text to the second device (e.g., the registered mobile device of the user) based on the mobile phone number collected through digital registration. The SMS message may comprise a direct link to the app store to download the mobile application. The second electronic device (e.g., the registered mobile device) may receive the SMS test. The user may click on the link in the SMS text on the second electronic device. The link may direct the user to the app store, where the user can download and install the mobile application on the second electronic device automatically.

In the second step, the analytic server may display a button on the first device that allows the user to automatically launch the mobile application and automatically log in. The button may allow the user to activate a QR code and scan the QR code using the camera of the registered mobile device (e.g., second electronic device). The downloaded mobile application may automatically launch and sign the user in.

At step 206, the analytic server may generate a token corresponding to an encrypted account identifier associated with the user. Once the analytic sever receives the indication that the user requests to activate the QR code, the analytic server may generate the token and further embed the token into the QR code.

The analytic server may comprise a token service with a database. Specifically, the analytic server may encrypt users' card numbers and store the encrypted card numbers into the database. The analytic server may generate the token corresponding to the encrypted account identifier, such as the encrypted card number. For example, the analytic server may embed parameters including the encrypted card number into the token. In some other embodiments, the analytic server may encrypt other identifier information of the user to generate the token.

Furthermore, the analytic server may return a handler for each encrypted card number. The handler may be time limited. For example, the handler may be valid for a predetermined time period. After the predetermined time period, the handler may become invalid. When the analytic server generates the handler, the analytic server may associate a timestamp with the handler. The timestamp may indicate the time when the handler/token is generated. Furthermore, the handler may be valid for one-time use. In other words, the handler can only be used once. In implementation, the analytic server may store the handler into a certain container. After first use of the handler, the analytic server may remove the handler from the container. Any subsequent users may not be able to access the handler because it has been removed. In some embodiments, the handler may comprise the key used to encrypt the card number. The container for storing the handler may be an Apple pass in Apple wallet.

At step 208, the analytic server may display an encoded graphical element corresponding to the token on the first electronic device. The encoded graphical element may be the QR code. Alternatively, the encoded graphical element may be a universal link or a deep link. The analytic server may embed the token into the QR code. The analytic server may display the encoded graphical element on the first electronic device that is used for the registration process. For example, after the user activates the QR code, the analytic server may generate the token, embed the token into the QR code, and display the QR code (e.g., encoded graphical element) on the administrator device. Upon the user scans the encoded graphical element using the user's registered mobile device (e.g., second electronic device), the analytic server may enable the automated digital enrollment on the mobile device. As a result, the user may be able to log into the mobile device automatically right after the account registration. The details of the automated digital enrollment on the mobile device are described in the following steps.

At step 210, the analytic server may receive an indication that the second electronic device has scanned the encoded graphical element. For example, the user may scan the QR code using a camera of the second electronic device (e.g., registered mobile device). Upon scanning of the encoded graphical element, the mobile device may read and extract the token in the encoded graphical element. As discussed above, the token embedded in the encoded graphical element (e.g., QR code) may comprise the encrypted card number of the user. The analytic server may receive the token comprising the encrypted card number from the mobile device (e.g., second electronic device).

Furthermore, the mobile application on the mobile device may access the handler, that is time limited and one-time use. The mobile device may access the handler from the handler container. Because the handler is time limited and only valid for a predetermined time period, the analytic server may compare the timestamp indicating when the handler is accessed with the timestamp indicating when the handler is generated. If the handler is accessed within the predetermined time period since the handler is generated, the analytic server may determine that the handler is valid.

Because the handler is valid for one-time use, the mobile device may remove the handler from the container after accessing the handler. As a result, the hander is valid for the first user who accesses it. The handler is valid if it has not been accessed by any other users.

At step 212, in response to the analytic server decrypting the encrypted account identifier, the analytic server may automatically reconfigure the mobile application on the second electronic device to access data associated with the user based on the account identifier. The analytic server may only reconfigure the mobile application to access data associated with the user when the analytic server receives the indication of scanning the encoded graphical element (e.g., QR code) within a predetermined time period. As discussed above, the analytic server may generate the token and return a handler. When the analytic server generate the token/handler, the analytic server may associate a timestamp with the token/handler. The timestamp may indicate the time when the handler/token is generated. The token/handler may be time limited and may be valid for a predetermined time period. Only if the user scans the QR code within the time period, the analytic server may launch the mobile application and reconfigure the mobile application.

Furthermore, the analytic server may only reconfigure the mobile application when the analytic server determines that the mobile application has not been previously configured to any user. In addition, the analytic server may only reconfigure the mobile application to access data associated with the user when the analytic server determines that an identifier of the second electronic device matches an identifier associated with the user (e.g., the second electronic device is a registered device of the user).

As discussed above, the mobile device (e.g., second electronic device) may extract the token upon scanning the encoded graphical element (e.g., QR code). The token may comprise the encrypted account identifier, such as the encrypted card number of the user. The analytic server may receive the extracted token from the mobile device. Furthermore, the analytic server may receive the handler accessed by the mobile device, which comprises the key used to encrypt the card number.

The analytic server may decrypt the encrypted card number by calling the token service based on the key in the handler. After the decryption, the analytic server may obtain the user's card number. As a result, the analytic server may be able to determine the user's account identifier. Upon the user scans the QR code with the mobile device, the analytic server may automatically launch the mobile application and automatically log the user into the mobile application and access data associated with the user based on the user's account identifier.

Furthermore, the analytic server may reconfigure the mobile application on the user's mobile device to enroll the user into a set of services. For example, the analytic server may enable the key features such as: "remember my card," security alert, and interact e-transfer. The service of "remember my card" may enable the mobile application to remember the user's card number, so that the user does not need to input the card number next time when he/she tries to log in. The service of security alert may notify the user by transmitting alert messages to the user's device when abnormal and suspicious behaviors/activities are detected on the user account. The service of interact e-transfer may be email money transfer ("EMT") service that allows the user to transfer money between the current user account and another account using email and the online banking service. The analytic server may collect the user's email address during the registration process. The analytic server may display a graphical user interface comprising guided steps that prompt the user to fund the current account using email.

Figure 2B:
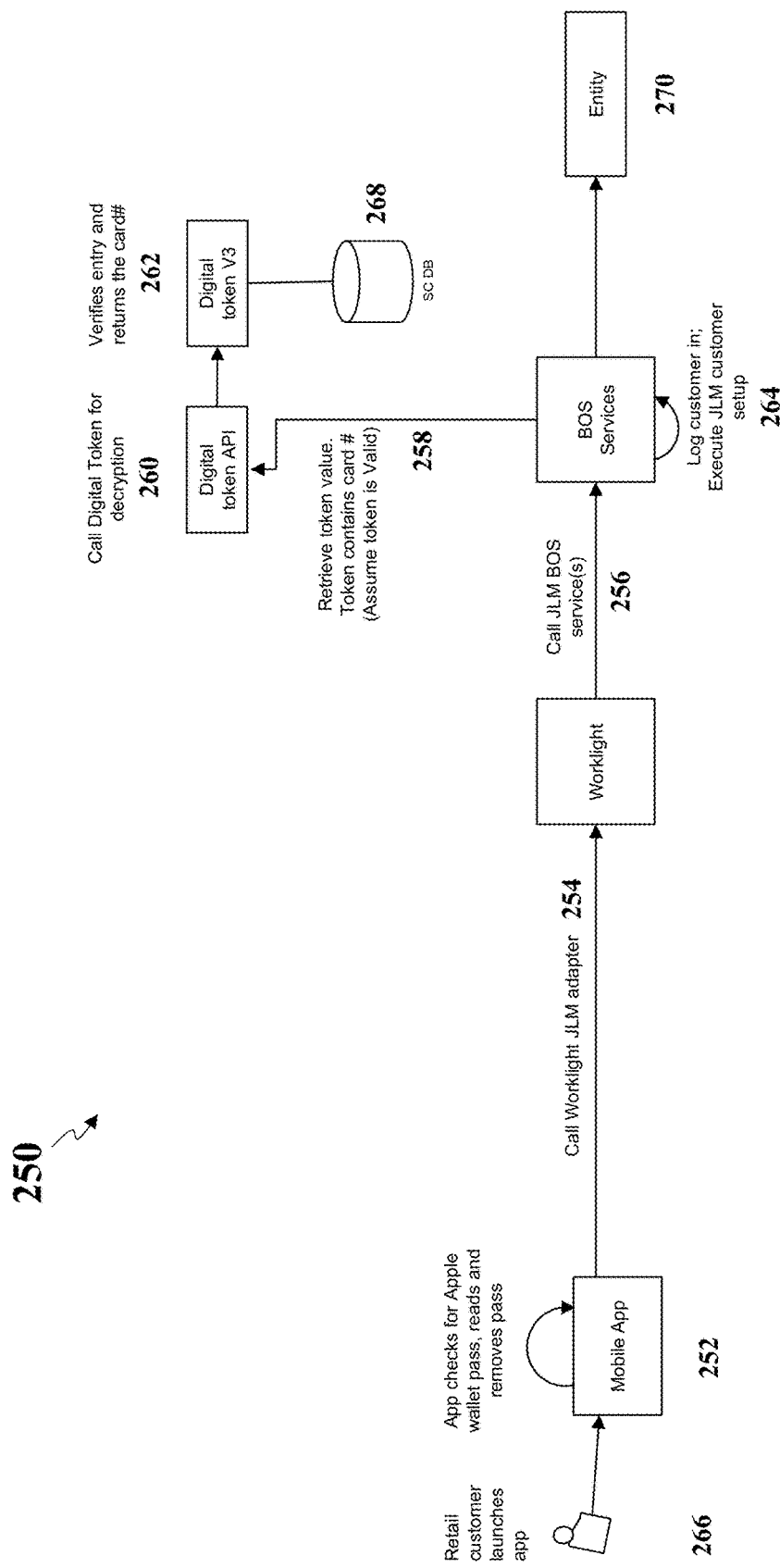
FIG. 2B illustrates an automated login process in the mobile application, according to an embodiment.

FIG. 2B illustrates an automated login process 250 in the mobile application, according to an embodiment. As discussed above, the analytic server may generate a token corresponding to the encrypted account identifier, such as the encrypted card number. The analytic server may return a handler for the encrypted card number. The handler may comprise the key used to encrypt the card number. The analytic server may store the handler into a certain container. For example, the analytic server may store the key into an Apple pass in Apple wallet or any other digital wallet application.

The analytic server may embed the token into the QR code. Upon the user scanning the QR code (e.g., launching the application 266) to launch the mobile application, the mobile device may check the Apple wallet pass, read the pass and remove the pass from Apple wallet 252. In this way, the pass (e.g., handler comprising the key) may be valid for a one-time use. The mobile device may call work light adapter 254 to communicate with the analytic server. The work light may be a middle service for the mobile application to call the back end service, such as the service 256 of the analytic server. The mobile device may also extract the token from the QR code and retrieve the token value that corresponds to the encrypted card number (258). The mobile device may call digital token for decryption 260 via the digital token application programming interface ("API"). The analytic server may decrypt the encrypted card number to obtain the user's card number 262. As a result, the analytic server may be able to determine the user's account identifier (e.g., by scanning the database 268) and automatically log the user into the mobile application 264. Furthermore, the analytic server may reconfigure the mobile application on the user's mobile device to enroll the user into a set of services and enable the corresponding key features. Once, logged in, the mobile device may be able to access services provided by an entity (270)

Figure 3A:
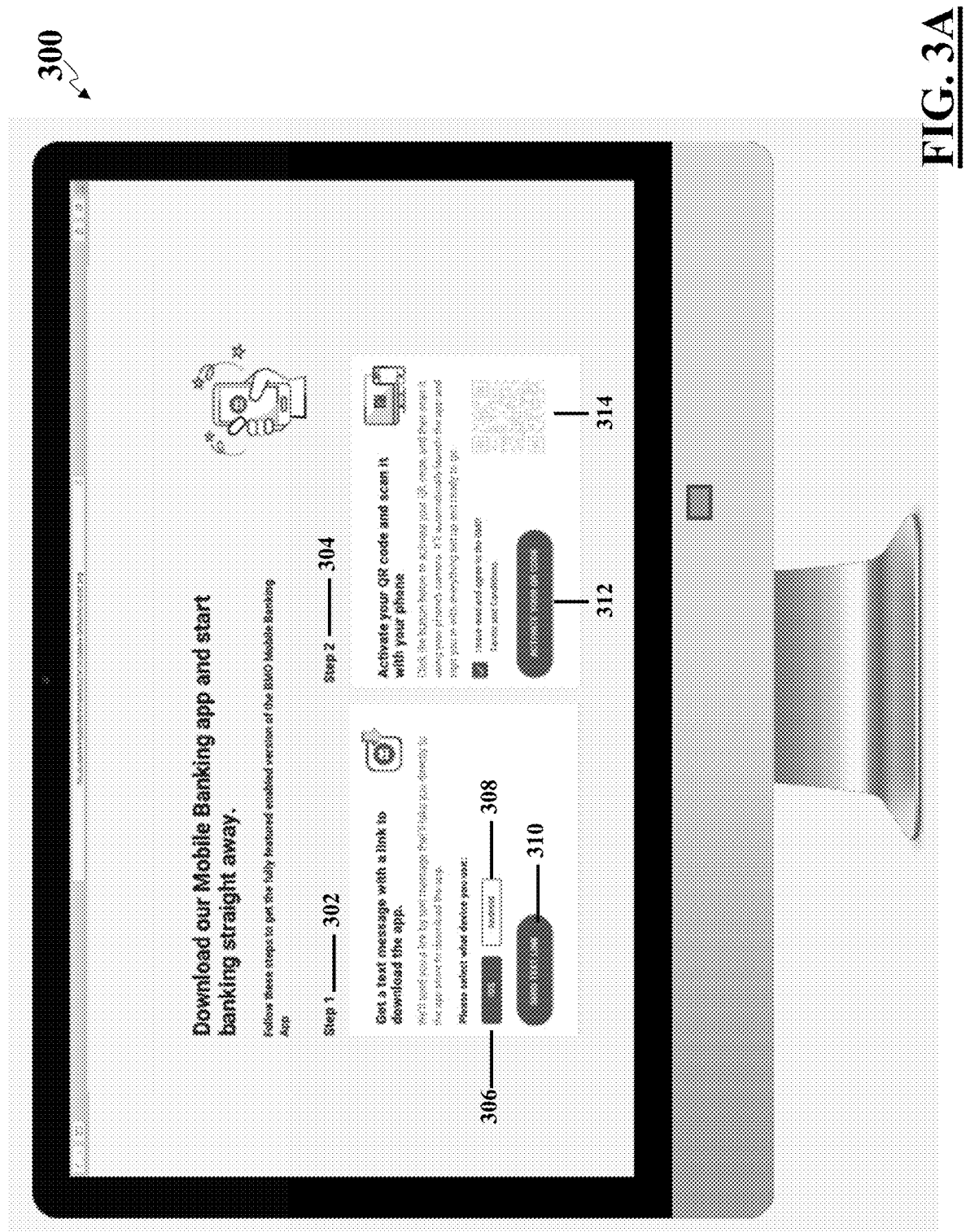
FIG. 3A illustrates a graphical user interface for instructing the user to download the mobile application and automatically launch the mobile application, according to an embodiment.

FIG. 3A illustrates a graphical user interface 300 for instructing the user to download the mobile application and automatically launch the mobile application, according to an embodiment. The analytic server may display the GUI 300 on the first electronic device, such as the administrator's device where the user completes the registration process. After the registration process, the first electronic device may display the GUI 300 to facilitate automated digital banking enrollment on the user's registered electronic device (e.g., second electronic device).

The GUI 300 may comprise instructions for two steps 302 and 304. The first step 302 may be for downloading the mobile application. Specifically, the first step 302 may instruct the user to get a text message with a link to download the application. The GUI 300 may comprise two buttons 306 and 308 representing two options for the type of registered mobile device, such as IOS device and Android device. The user may select one of the two options to indicate the user's device type. The GUI 300 may also comprise a button 310 for sending the text link. Upon the user clicking on the button 310, the analytic server may send the SMS text message to the user's registered mobile device. The text message may include the link/hyperlink to download the mobile application. The link may be based on the type of user device. For example, if the user device is an IOS device, the link may be a direct link to the Apple store to download the mobile application. If the user device is an Android device, the link may be a direct link to the Google play store to download the mobile application.

Figure 3B:
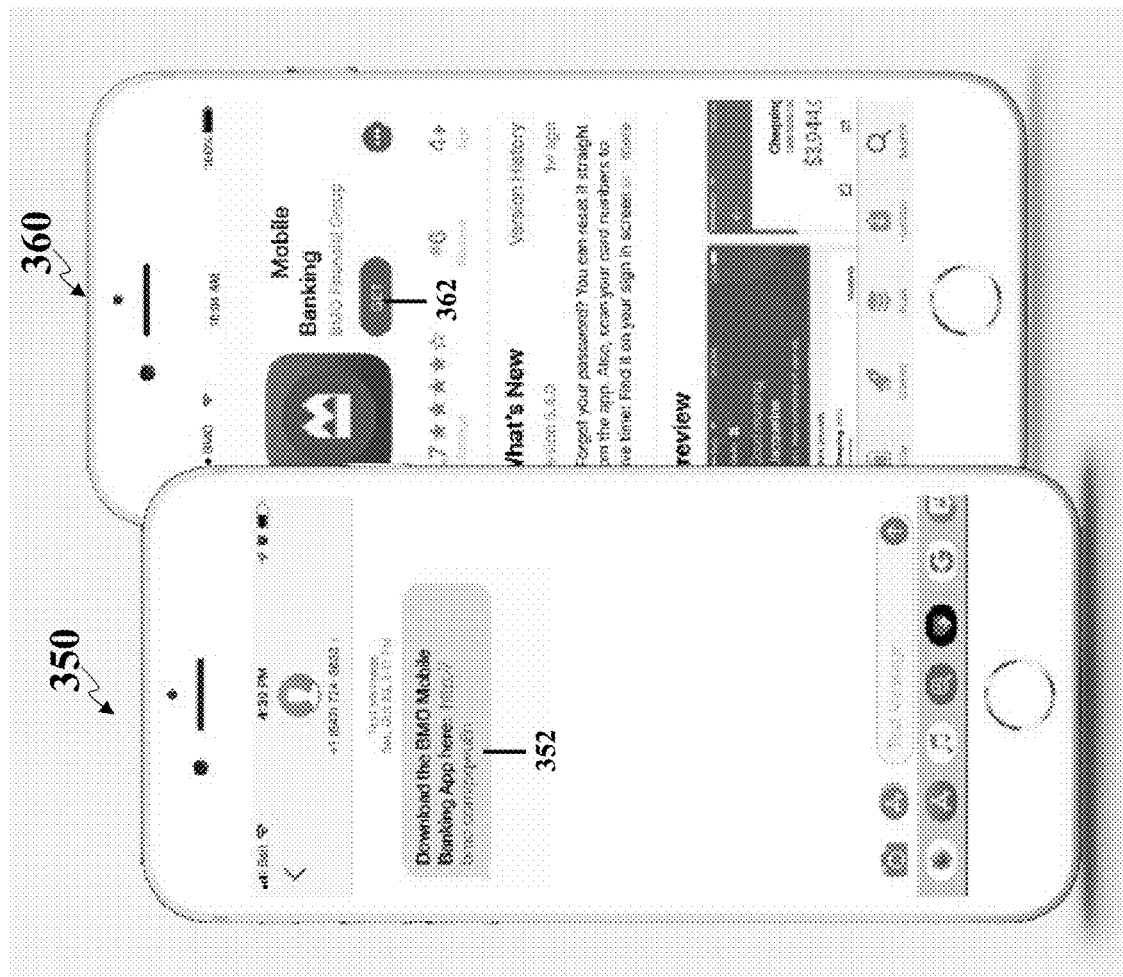
FIG. 3B illustrates graphical user interfaces for downloading the mobile application on the mobile device, according to an embodiment.

FIG. 3B illustrates the graphical user interfaces 350 and 360 for downloading the mobile application on the mobile device, according to an embodiment. After the user clicking on the button 310 for sending the text link in FIG. 3A, the user's mobile device (e.g., second electronic device) may receive the text message. The GUI 350 may comprise the SMS text message 352 including the link to download the mobile application. Upon the use clicking on the link, the mobile device may display the GUI 360. The GUI 360 may comprise the information about the mobile application. For example, the GUI 360 may comprise the rating of the mobile application, the introduction of new features of the mobile application, the reviews from other users. The GUI 360 may also comprise a button 362 that enables the downloading of the mobile application to the mobile device.

Referring back to FIG. 3A, the GUI 300 may also comprise a second step 304 for activating QR code. The second step 304 may allow the user to activate the QR code and scan the QR code using the camera of the registered mobile device (e.g., second electronic device). The downloaded mobile application may automatically launch and sign the user in.

The GUI 300 may comprise a checkbox 316 for the user to indicate the user has read and agreed the terms and conditions. The GUI 300 may also comprise a button 312 for activating the QR code 314. Upon the user clicking on the button 312 for activating the QR code 314, the QR code 314 may become available for scanning. For example, the QR code 314 may be grey before activation. After activation, the QR code 314 may become bold.

Upon the user activating the QR code 314, the analytic server may generate the token and embed the token into the QR code 314. As discussed above, the analytic server may encrypt the card number and return a handler in the token service. The analytic server may associate a timestamp with the handler. The user may need to scan the QR code 314 within the predetermined time period.

Figure 4A:
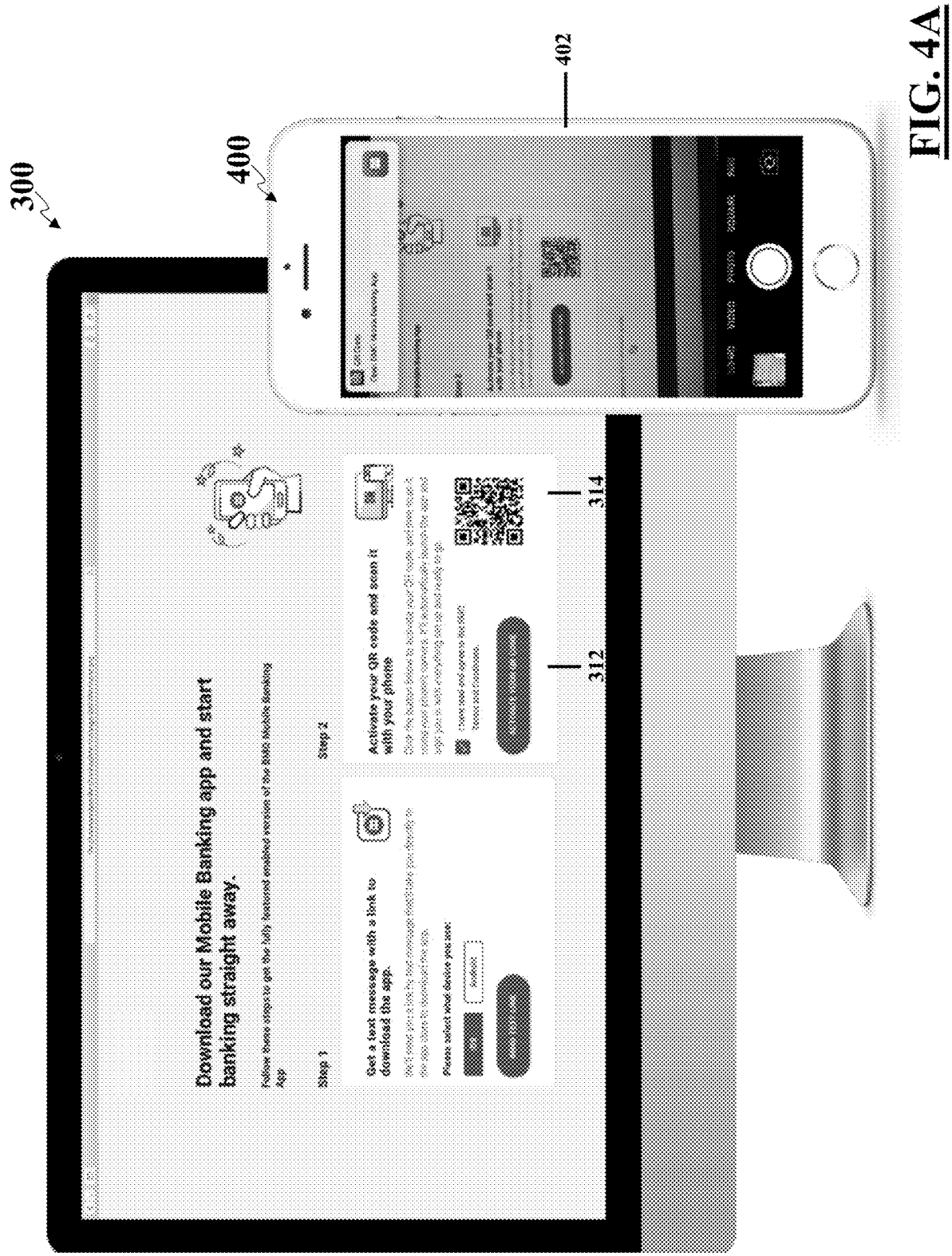
FIG. 4A illustrates a graphical user interface for scanning a QR code, according to an embodiment.

FIG. 4A illustrates the graphical user interface 400 for scanning the QR code, according to an embodiment. The user may use the camera of the second electronic device (e.g., mobile device) to scan the QR code 314 displayed on the first electronic device. As shown in the figure, the GUI 400 may display the QR code within the view 402 of the turned on camera on the mobile device.

Figure 4B:
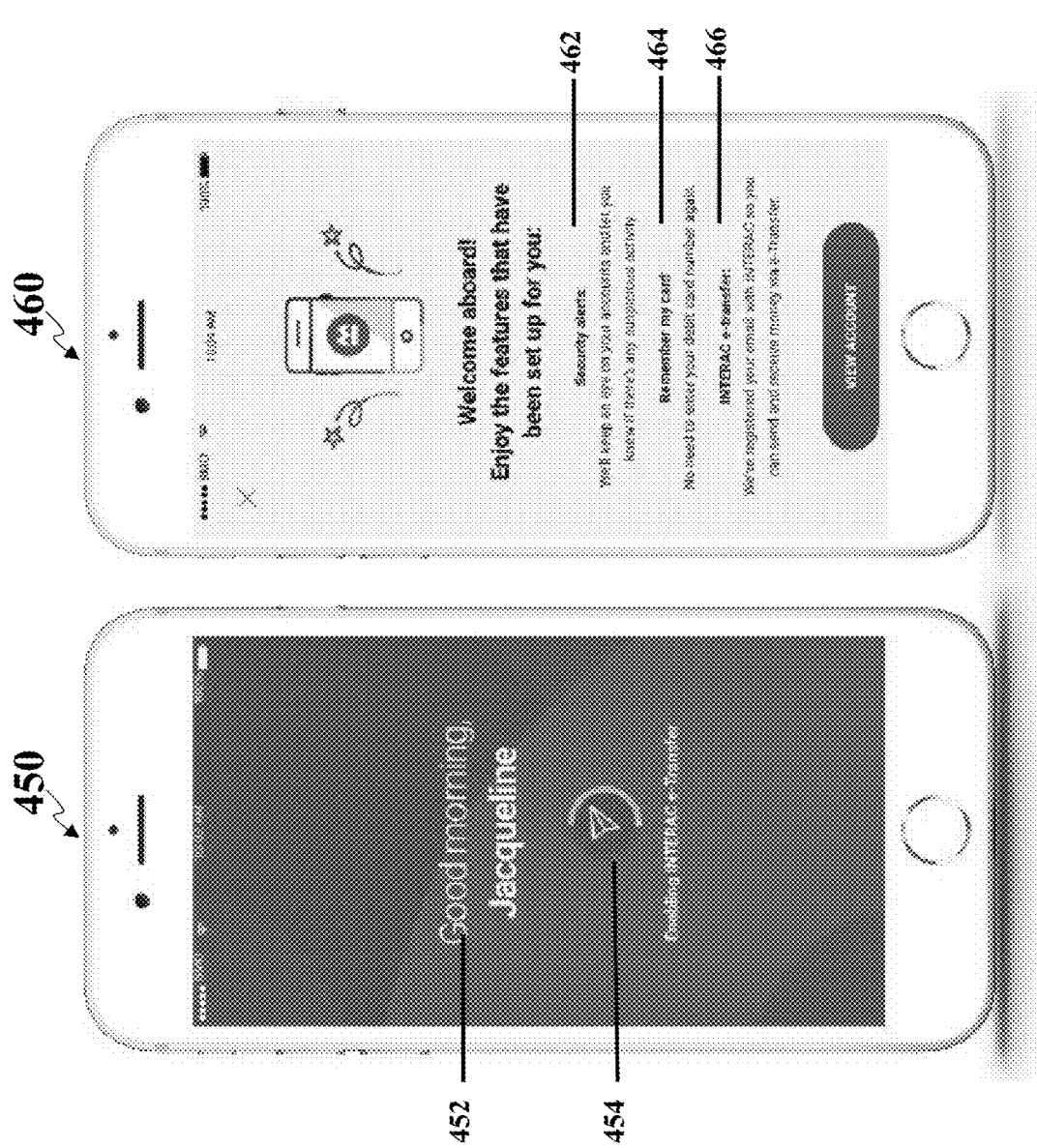
FIG. 4B illustrates graphical user interfaces for auto-launching the mobile application and auto-logging in for the user, according to an embodiment.

FIG. 4B illustrates the graphical user interfaces 450, 460 for auto-launching the mobile application and auto-logging in for the user, according to an embodiment. The GUI 450 may comprise a greeting message 452 for the user and a circular progress bar 454 showing the progress of the launching process. After the analytic server launches the mobile application on the mobile device and logs the user in, the analytic server may activate/set up a set of features/ services for the user. The GUI 460 may display the set up features, such as security alerts 462, "remember my card" 464, and e-transfer 466. The security alert service 462 may notify the user when there is any suspicious activity. The "remember my card" service 464 may remember the user's card number, so that the user does not need to enter the card number again. The e-transfer service 466 may allow the user to send and/or receive money using email.

Figure 5A:
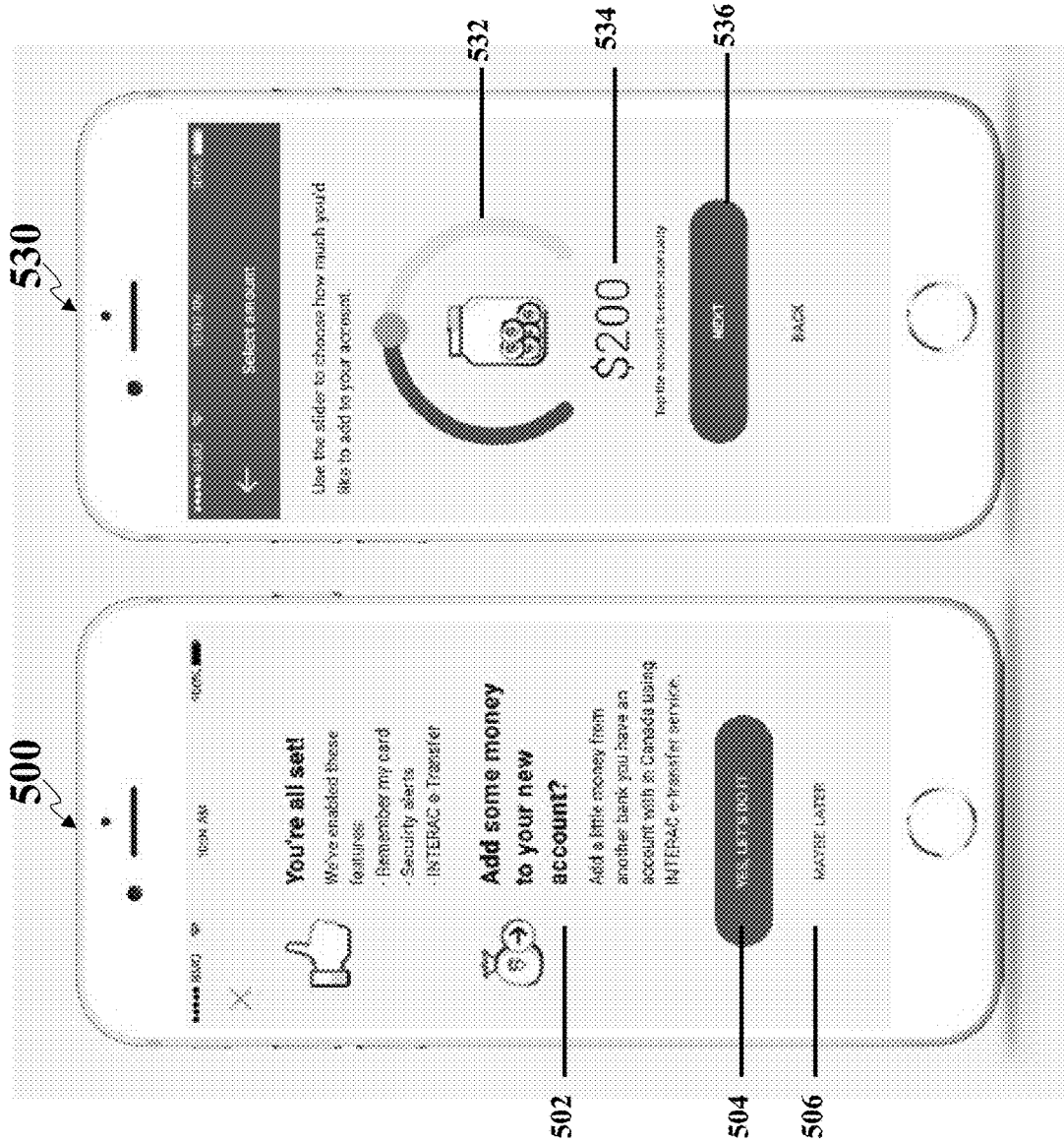
FIGS. 5A-5B illustrate graphical user interfaces for funding the new account, according to an embodiment.
Figure 5B:
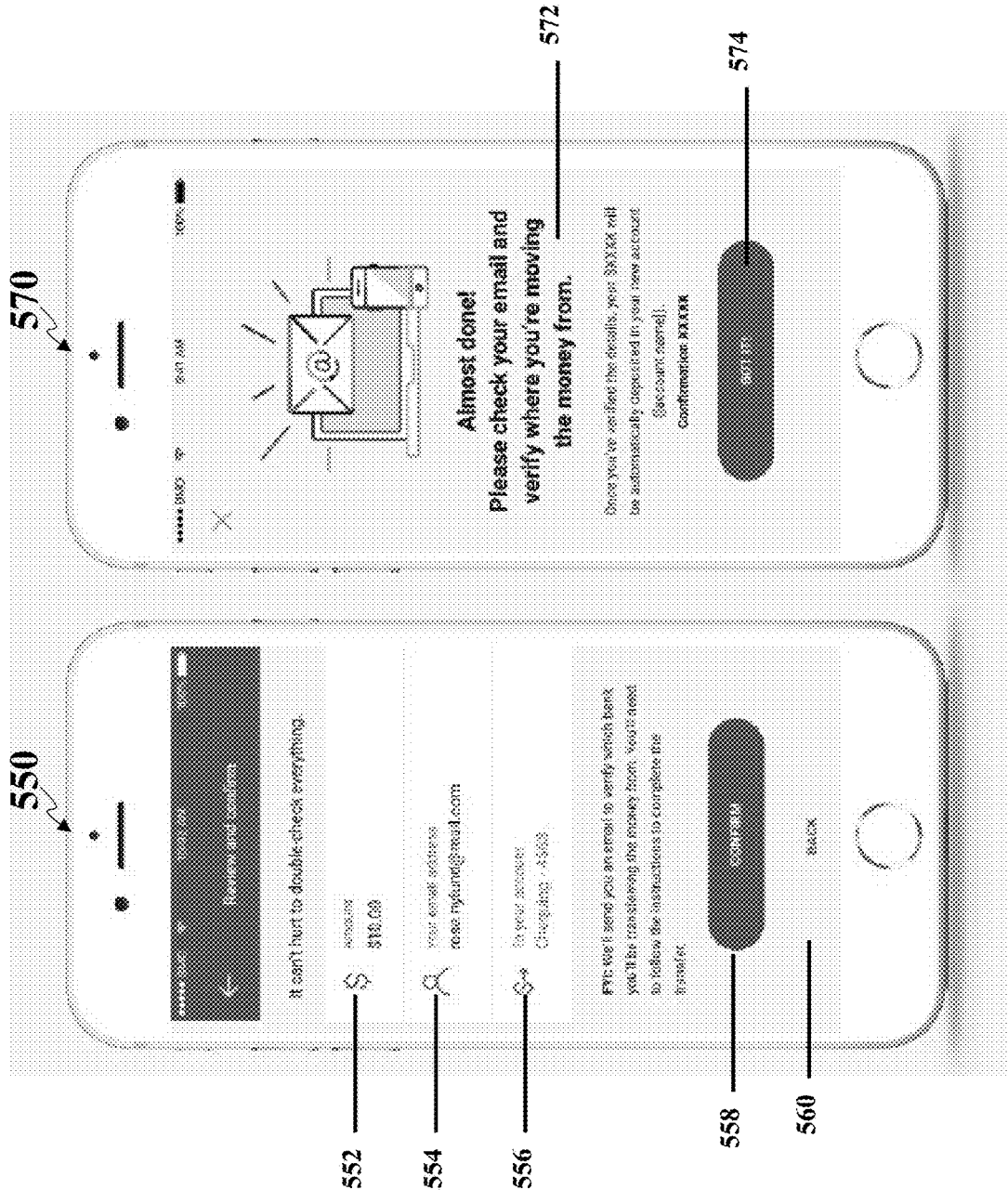

FIGS. 5A-5B illustrate the graphical user interfaces 500, 530, 550, 570 for funding the new account (e.g., the current account), according to an embodiment. The GUI 500 may comprise instructions 502 for funding the new account. The GUI 500 may comprise an interactive element (e.g., button) 504 that prompts the user to add money from another bank account using the e-transfer service. The GUI 500 may also comprise an interactive element (e.g., button) 506 the allows the user to not fund the account at the moment but sometime later.

The GUI 530 may comprise an interactive element (e.g., a slider) 532 that allows the user to choose the amount of money to add to the account. The slider 532 may be a control that allows the user to select the amount of money from a range of values by moving the thumb control along the track. The GUI 530 may display the selected amount value in a text field 534. The text field 534 may also allow the user to tap the amount value and enter/input another value of the user's choice. The GUI 530 may also comprise a button 536 to proceed to a next step.

The GUI 550 may be a user interface for reviewing and confirming the information for funding the new account through email. The GUI 550 may comprise the amount of money 552, the email address of the user 554, the receiving user account 556. The GUI 550 may also comprise a button 558 for confirming the information and a button 560 for going back to the previous step to revise the information.

The GUI 570 may comprise the instruction 572 for verifying the transferring details, such as the account the money comes from. For example, the instruction 572 may instruct the user to check his/her email and verify the account the money comes from. Once the user verifies the details in the email, the analytic server may automatically deposit the selected amount of money into the new account. The GUI 570 may also comprise a button 574 for the user to indicate the receipt of the instruction 572.

The steps illustrated in these GUIs 500, 530, 550, 570 may provide an easy solution to allow users to put some money in their accounts within a few minutes after they automatically log into the mobile application for the first time.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc ("CD"), laser disc, optical disc, digital versatile disc ("DVD"), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method comprising:
   in response to presenting one or more input elements to be displayed on a first electronic device, receiving, by a server, at least one user attribute and a request for an automatic installation and enrollment of a mobile application on a second electronic device operated by a user;
   generating, by the server, a token by encrypting, using a key, corresponding to an encrypted account identifier associated with the user; storing, by the server, a time-limited handler including the key used to encrypt the account identifier;
   presenting, by the server to be displayed on the first electronic device, an encoded graphical element corresponding to the token; receiving, by the server, an indication that the second electronic device has scanned the encoded graphical element, wherein the server receives the token from the second electronic device, wherein the mobile application is installed onto the second electronic device; decrypting, by the server, the token using the key in the time-limited handler;
   in response to the server decrypting the encrypted account identifier, automatically enrolling, by the server, the user via the mobile application by: reconfiguring, by the server, the mobile application using the decrypted account identifier, such that the mobile application is configured to access data associated with the user and the decrypted account identifier; and enabling, by the server, at least one feature of the mobile application corresponding to at least one service associated with an account of the user; and
   wherein the server only reconfigures the mobile application when the server determines that the mobile application has not been previously configured to any other users.

2. The method of claim 1, wherein the server determines a timestamp of generation of the token, and wherein the server reconfigures the mobile application to access data associated with the user when the timestamp is within a predetermined time period.

3. The method of claim 1, wherein the server only reconfigures the mobile application to access data associated with the user when the server receives the indication within a predetermined time period.

4. The method of claim 1, wherein the server only reconfigures the mobile application to access data associated with the user when the server determines that an identifier of the second electronic device matches an identifier associated with the user.

5. The method of claim 4, wherein the identifier of the second electronic device is at least one of a telephone number, media access control address, international mobile equipment identity, and a unique electronic identifier.

6. The method of claim 1, wherein the encoded graphical element is a QR code.

7. The method of claim 1, wherein the encoded graphical element is a deep link.

8. The method of claim 1, wherein the first electronic device and the second electronic device are both operated by the user.

9. The method of claim 1, wherein the first electronic device is operated by an administrator of an entity and the second electronic device is operated by the user.

10. A computer system comprising: a first electronic device, a second electronic device, and a server in communication with the first and second electronic devices and configured to:
  In response to presenting one or more input elements to be displayed on the first electronic device, receive at least one user attribute and a request for an automatic installation and enrollment of a mobile application on the second electronic device operated by a user;
  generate a token by encrypting, using a key, corresponding to an encrypted account identifier associated with the user; store a time-limited handler including the key used to encrypt the account identifier;
  present, to be displayed on the first electronic device, an encoded graphical element corresponding to the token;
  receive an indication that the second electronic device has scanned the encoded graphical element, wherein the server receives the token from the second electronic device, wherein the mobile application is installed onto the second electronic device; decrypt the token using the key in the time-limited handler,
  in response to the server decrypting the encrypted account identifier, automatically enroll the user via the mobile application by: reconfigure the mobile application using the decrypted account identifier, such that the mobile application is configured to access data associated with the user based on decrypted account identifier; and enable at least one feature of the mobile application corresponding to at least one service associated with an account of the user; and
  wherein the server only reconfigures the mobile application when the server determines that the mobile application has not been previously configured to any other users.

11. The computer system of claim 10, wherein the server determines a timestamp of generation of the token, and wherein the server reconfigures the mobile application to access data associated with the user when the timestamp is within a predetermined time period.

12. The computer system of claim 10, wherein the server only reconfigures the mobile application to access data associated with the user when the server receives the indication within a predetermined time period.

13. The computer system of claim 10, wherein the server only reconfigures the mobile application to access data associated with the user when the server determines that an identifier of the second electronic device matches an identifier associated with the user.

14. The computer system of claim 13, wherein the identifier of the second electronic device is at least one of a telephone number, media access control address, international mobile equipment identity, and a unique electronic identifier.

15. The computer system of claim 10, wherein the encoded graphical element is a QR code.

16. The computer system of claim 10, wherein the encoded graphical element is a deep link.

17. The computer system of claim 10, wherein the first electronic device and the second electronic device are both operated by the user.

18. The computer system of claim 10, wherein the first electronic device is operated by an administrator of an entity and the second electronic device is operated by the user.

* * * * *